US005672831A

United States Patent [19]

[11] Patent Number: 5,672,831

[45] Date of Patent: Sep. 30, 1997

Codina et al.

[54] CAPACITIVE FLOW SENSOR

[75] Inventors: George Codina, North Hollywood, Calif.; Chandrasekar Ramamoorthy, Normal; Donna J. Murr, Dunlap, both of Ill.

[73] Assignee: Caterpillar Inc., Peoria, Ill.

[21] Appl. No.: 522,024

[22] Filed: Aug. 31, 1995

[51] Int. Cl.[6] .......... G01F 1/56

[52] U.S. Cl. .......... 73/861.12

[58] Field of Search .......... 73/861.08, 861.12; 324/677, 663, 453, 676, 678

[56] References Cited

U.S. PATENT DOCUMENTS

| | | | |
|---|---|---|---|
| 3,595,078 | 7/1971 | Beck et al. | 73/194 |
| 3,635,082 | 1/1972 | Prellwitz et al. | 73/194 |
| 3,715,656 | 2/1973 | Hyde et al. | 324/678 |
| 3,802,261 | 4/1974 | Zimmerman et al. | 73/194 |
| 4,065,715 | 12/1977 | Jaffe et al. | 324/678 |
| 4,074,184 | 2/1978 | Dechene et al. | 324/30 |
| 4,240,028 | 12/1980 | Davis, Jr. | 324/61 |
| 4,266,188 | 5/1981 | Thompson | 324/65 |
| 4,468,611 | 8/1984 | Tward | 324/61 |
| 4,484,582 | 11/1984 | Rottenberg et al. | 73/861.08 |
| 4,604,904 | 8/1986 | Massen | 73/861 |
| 4,658,208 | 4/1987 | Lee et al. | 324/61 |
| 4,713,603 | 12/1987 | Thorn | 324/61 |
| 4,714,048 | 12/1987 | Jefferies et al. | 119/14.08 |
| 4,751,842 | 6/1988 | Ekrann et al. | 73/61.1 |
| 4,888,989 | 12/1989 | Homer | 73/304 C |
| 4,894,604 | 1/1990 | Dowling et al. | 324/690 |
| 4,920,795 | 5/1990 | Codazzi et al. | 73/195 |
| 5,382,942 | 1/1995 | Raffa et al. | 340/457 |

OTHER PUBLICATIONS

SAE Technical Paper Series —910497 Feb 25–Mar. 1, 1991 "A Capacitive Oil Deterioration Sensor".

*Primary Examiner*—Richard Chilcot
*Assistant Examiner*—Harshad Patel
*Attorney, Agent, or Firm*—James R. Yee; David M. Masterson

[57] ABSTRACT

An apparatus for measuring the flow rate of a liquid in a line includes a capacitor formed by a pair of electrodes. A charging circuit produces a charging current of constant magnitude. The charging current is used to charge the capacitor to a predetermined voltage. A timing circuit measures the time between the time at which the charging circuit begins to produce the charging current and the time at which the capacitor has been charged to the predetermined voltage. The timing circuit produces a pulse width modulated signal. The magnitude of the pulse width modulated signal is indicative of the time difference.

2 Claims, 1 Drawing Sheet

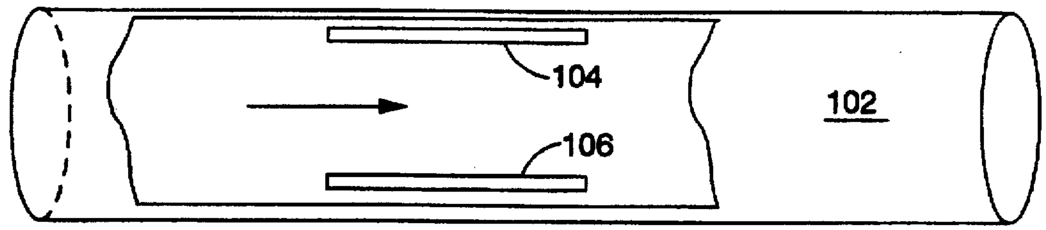
Fig_1_
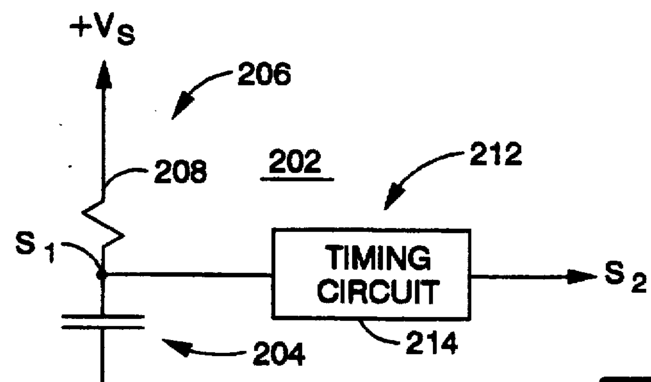
Fig_2_
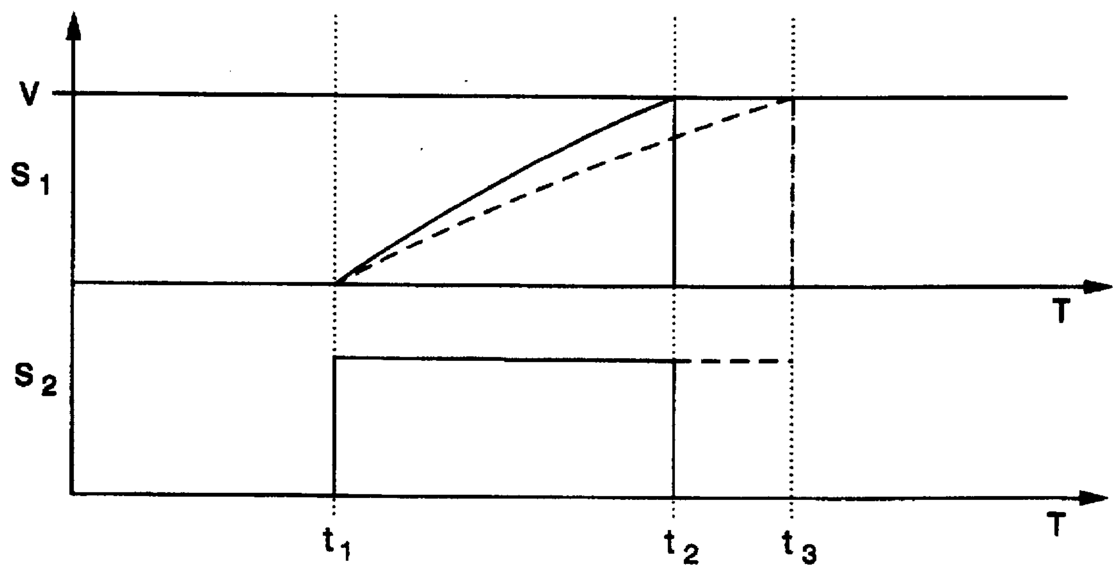
Fig_3_

CAPACITIVE FLOW SENSOR

TECHNICAL FIELD

This invention relates generally to capacitive flow sensors and more particularly to a capacitive flow sensor which produces a pulse signal whose width is indicative of flow.

BACKGROUND ART

Flow sensors for measuring the flow rate of a liquid are known. Many different technologies have been applied to this problem: noise measurements, ultrasonics, and measuring heat loss are but a few. However, these types of sensors share several undesirable traits, including high cost and high maintenance.

For example in the earthmoving industry, earthmoving machines operate in a highly hostile environment. The machines' work implements are typically powered by hydraulics. One of the problems associated with sensors in these types of environments is reliability. The hostile environments are harsh on the sensors and reduce the operating life of the sensors.

The present invention is directed to overcoming one or more of the problems, as set forth above.

DISCLOSURE OF THE INVENTION

In one aspect of the present invention an apparatus for measuring the flow rate of a liquid in a line is provided. The apparatus includes a pair of electrodes contained within the line and oppositely spaced, forming a capacitor. A charging circuit produces a charging current of constant magnitude and charges the capacitor to a predetermined voltage. A timing circuit detects the time at which the charging circuit begins to produce the charging current and the time at which the capacitor has been charged to the predetermined voltage, and produces a pulse width modulated signal. The magnitude of the pulse width modulated signal is indicative of the time between the start of the constant current and the time at which the capacitor has been charged to the predetermined voltage.

BRIEF DESCRIPTION OF THE DRAWINGS

FIG. 1 is a diagrammatic view of a line 102 for transporting fluid;

FIG. 2 is a block diagram of a fluid flow sensor according to an embodiment of the present invention; and FIG. 3 is a graphical illustration of relevant signals within the fluid flow sensor of FIG. 1.

BEST MODE FOR CARRYING OUT THE INVENTION

With reference to FIG. 1, the present invention is adapted to measure the flow of fluid within a line 102. The line 102 refers to any tube, pipe or similar device for transporting fluid. Fluid flow occurs in the direction of the arrow.

With reference to FIGS. 1 and 2, the present invention, apparatus or sensor 202 includes a pair of electrodes. The electrodes 104, 106 are contained within the line 102 and are oppositely spaced so as to form a capacitor 204. Preferably, the electrodes do not obstruct fluid flow. The fluid flowing between the electrodes 104,106 is the dielectric of the capacitor 204. The electrodes may be flat or curved and rectangular, triangular or otherwise shaped.

A charging means 206 is connected to the capacitor 204. The charging means includes a resistor 208 and a source of constant voltage, $V_s$. The charging means 206 produces a charging current of constant magnitude. The magnitude of the charging current is determined by the magnitude of the resistor 208. The charging current charges the capacitor 204 until a predetermined voltage (V) across the capacitor is reached. Preferably, the resistor 208 is variable to allow for adjustment of the sensor 202. For example to measure flow rate, a range of exemplar charging currents, and resistor values, and an exemplar predetermined voltage are 0.2 to 1.0 microamps, 10–40 MOhms, and 9 volts respectively. The charging current will vary from system to system and will be determined to minimize or eliminate the effects of other system parameters, e.g., pressure, on the charging time.

The effects of fluid temperature variations is preferably minimized by heating the electrodes 104,106.

A timing means 212 is also connected to the capacitor 204. The timing means 212 includes a timing circuit 214. The timing circuit 214 detects the time at which the charging circuit begins to produce the charging current and the time at which the capacitor has been charged to the predetermined voltage. The timing circuit also produces a pulse width modulated signal. The magnitude of each pulse of the pulse width modulated signal is indicative of the elapsed time between the time at which the charging circuit begins to produce the charging current and the time at which the capacitor has been charged to the predetermined voltage. In the preferred embodiment, the magnitude of the pulse width signal is equal to the pulse duration.

In the preferred embodiment, the timing means 212 includes a MC1555 timing integrated circuit which is available from Motorola Corp., of Schaumburg Ill. The MC1555 circuit advantageously senses when the capacitor 204 has reached the predetermined voltage and responsively discharges the capacitor into electrical ground.

Industrial Applicability

With reference to FIGS. 1 and 2, the present invention is adapted to measure the rate of flow of fluid within a line 102, e.g., the flow of hydraulic oil within a hydraulic line.

With reference to FIG. 2, the operation of the sensor 202 is discussed below. The charging means 206 produces a charging current. The charging current has a constant magnitude as determined by the magnitude of the resistor 208. The charging means 206 charges the capacitor 204 via the charging current until it reaches a predetermined voltage, at which time the charging current is stopped and the energy stored in the capacitor is allowed to decay. $S_1$ refers to the voltage across the capacitor 204.

The timing circuit 214 detects the time at which the charging means 206 begins to supply the charging current and detects the time at which the capacitor 204 has reached the predetermined voltage level. The timing circuit 214 produces a pulse width modulated signal ($S_2$). Each pulse has a duration equal to the difference between the time at which the charging means 206 begins to supply the charging current and detects the time at which the capacitor 204 has reached the predetermined voltage level. Preferably, the pulses have a constant period, e.g., 30 milliseconds.

For example, the pulse width output at zero (0) liters per minutes is taken as the reference in the calculation of flow rate. Referring to FIG. 3, if the charging means 206 begins to change at $t_1$ and reaches the predetermined voltage at $t_2$, then the output pulse width is $t_2$–$t_1$. When the flow rate increases, the charged molecules are carried away from the plate due to the momentum of the flow, thus resulting in an increases in the output pulse width as shown by the dotted lines. With a nonzero flow, the capacitor 204 is charged to the predetermined voltage at $t_3$. The output pulse width is $t_3-t_1$. The difference between the increased pulse width and the reference pulse width gives a measure of the desired fluid flow rate.

Other aspects, objects, and features of the present invention can be obtained from a study of the drawings, the disclosure, and the appended claims.

We claim:

1. An apparatus for measuring the flow rate of a dielectric liquid in a line, comprising:

a pair of electrodes contained within the line and oppositely spaced, forming a capacitor;

charging means, coupled to said capacitor, for producing a charging current of constant magnitude and charging said capacitor to a predetermined voltage; and, timing means, connected to said capacitor, for detecting the time at which said charging means begins to produce said charging current and the time at which said capacitor has been charged to said predetermined voltage, and for producing a pulse width modulated signal, the magnitude of said pulse width modulated signal being indicative of a charging time, said charging time defined as the time between the start of said constant current and the time at which said capacitor has been charged to said predetermined voltage and being indicative of the flow rate of the liquid flowing through the container.

2. A method for measuring the flow rate of a dielectric liquid flowing in a line using a capacitor formed by a pair of electrodes contained with within the container and being oppositely spaced, including the steps of:

producing a charging current of constant magnitude and charging the capacitor to a predetermined voltage; and detecting the time of start of said constant current and the time at which the capacitor has been charged to said predetermined voltage and producing a pulse width modulated signal, the magnitude of said pulse width modulated signal being indicative of a charging time, said charging time defined as the time between the start of said constant current and the time at which the capacitor has been charged to said predetermined voltage and being indicative of the flow rate of the liquid flowing through the container.

* * * * *